United States Patent
Stakutis et al.

(10) Patent No.: US 6,658,417 B1
(45) Date of Patent: Dec. 2, 2003

(54) TERM-BASED METHODS AND APPARATUS FOR ACCESS TO FILES ON SHARED STORAGE DEVICES

(75) Inventors: Christopher J. Stakutis, Concord, MA (US); William Haselton, Peabody, MA (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 09/687,390

(22) Filed: Oct. 13, 2000

Related U.S. Application Data

(63) Continuation-in-part of application No. 09/309,453, filed on May 11, 1999, now Pat. No. 6,161,104, which is a continuation of application No. 09/002,266, filed on Dec. 31, 1997, now Pat. No. 5,950,203.

(51) Int. Cl.$^7$ .............................................. G06F 17/30
(52) U.S. Cl. ........................................ 707/10; 707/201
(58) Field of Search ................................ 707/100, 205, 707/204, 200, 10, 8, 202, 1, 201; 710/38, 20, 39; 711/1, 113, 162, 111, 171; 709/215, 240, 203, 217, 226, 223; 712/10; 705/43; 714/6; 700/5; 702/176; 341/106; 379/93.25; 345/835, 502; 235/380; 370/238, 401; 360/48; 365/230.03; 369/30.31

(56) References Cited

U.S. PATENT DOCUMENTS

| | | | |
|---|---|---|---|
| 5,014,197 A | 5/1991 | Wolf | 710/38 |
| 5,109,336 A | 4/1992 | Guenther et al. | 365/230.03 |

(List continued on next page.)

FOREIGN PATENT DOCUMENTS

| | | | |
|---|---|---|---|
| EP | 0 066 039 B1 | 8/1985 | |
| EP | 0 476 962 A2 | 3/1992 | |

(List continued on next page.)

OTHER PUBLICATIONS

Bai, Guangyi, et al. "Implementation and Performance Evaluation of a Distributed Paged–Object Storage Server," IEICE Transactions on Information and Systems Vol. E78–D, No. 11 (Nov. 1995) pp. 1439–1448.

(List continued on next page.)

*Primary Examiner*—Charles Rones
*Assistant Examiner*—Yicun Wu
(74) *Attorney, Agent, or Firm*—David W. Victor; Konrad Raynes Victor & Mann LLP.

(57) ABSTRACT

Methods and apparatus for accessing files on networked digital data processing system provide for plurality of digital data processing nodes and a storage device, e.g., a disk drive, a "jukebox," other mass storage device or other mapped device (collectively referred to herein after as "disk drive" or "storage device"). First and second ones of the nodes, which may be a client and a server node, respectively, are coupled for communication over a first communications pathway, e.g., a LAN or other network. Both the first and the second nodes are in communication coupling with the storage device over the same or different logical or physical communications pathways. A file system or other functionality in the second (server) node receives and responds to at least selected requests—e.g., file OPEN requests—from the first (client) node for access to a file on the storage device, by generating a "lease". The lease includes a block map or other administrative data (referred to elsewhere herein as "meta data") for the requested file, as well as an expiry time indicating how long the administrative data is valid. Upon grant of the lease, the client node accesses the storage device using the block map or other administrative data supplied with the lease. The server node assures that this administrative data remains valid for the period of the lease, e.g., such that the client node may directly access the requested file without risk that another node (or the server itself) has changed it. Correspondingly, the client node ceases utilization of the administrative data (and, presumably, ceases at least direct access of the file) after lease expiry.

19 Claims, 4 Drawing Sheets

U.S. PATENT DOCUMENTS

| | | | |
|---|---|---|---|
| 5,129,088 A | 7/1992 | Auslander et al. | 711/1 |
| 5,163,156 A | 11/1992 | Leung et al. | 709/215 |
| 5,193,168 A | 3/1993 | Corrigan et al. | 707/100 |
| 5,218,676 A | 6/1993 | Ben-Ayed et al. | 709/240 |
| 5,218,697 A | 6/1993 | Chung | 709/203 |
| 5,237,682 A | 8/1993 | Bendert et al. | 707/205 |
| 5,247,660 A | 9/1993 | Ashcraft et al. | 707/205 |
| 5,313,631 A | 5/1994 | Kao | 707/204 |
| 5,359,725 A | 10/1994 | Garcia et al. | 707/200 |
| 5,367,698 A | 11/1994 | Webber et al. | 709/203 |
| 5,374,928 A | 12/1994 | Moore et al. | 341/106 |
| 5,388,243 A | 2/1995 | Glider et al. | 710/20 |
| 5,463,381 A | 10/1995 | Ryu et al. | 707/10 |
| 5,463,754 A | 10/1995 | Beausoleil et al. | 707/200 |
| 5,530,857 A | 6/1996 | Gimza | 707/10 |
| 5,530,905 A | 6/1996 | Nichols et al. | 709/203 |
| 5,535,406 A | 7/1996 | Kolchinsky | 712/10 |
| 5,537,574 A | 7/1996 | Elko et al. | 700/5 |
| 5,557,770 A | 9/1996 | Bhide et al. | 711/114 |
| 5,577,240 A | 11/1996 | Demers et al. | 707/8 |
| 5,586,256 A | 12/1996 | Thiel et al. | 345/502 |
| 5,592,612 A | 1/1997 | Birk | 714/6 |
| 5,604,862 A | 2/1997 | Midgely et al. | 710/39 |
| 5,649,194 A | 7/1997 | Miller et al. | 707/200 |
| 5,657,450 A | 8/1997 | Rao et al. | 702/176 |
| 5,673,382 A | 9/1997 | Cannon et al. | 707/202 |
| 5,675,798 A | 10/1997 | Chang | 709/203 |
| 5,689,700 A | 11/1997 | Miller et al. | 707/10 |
| 5,692,128 A | 11/1997 | Bolles et al. | 709/217 |
| 5,692,178 A | 11/1997 | Shaughnessy | 707/8 |
| 5,734,828 A | 3/1998 | Pendse et al. | 709/203 |
| 5,737,536 A | 4/1998 | Herrmann et al. | 709/217 |
| 5,740,371 A | 4/1998 | Wallis | 709/226 |
| 5,751,997 A | 5/1998 | Kullick et al. | 709/215 |
| 5,765,193 A | 6/1998 | Rosich et al. | 711/136 |
| 5,768,528 A | 6/1998 | Stumm | 379/93.25 |
| 5,774,670 A | 6/1998 | Montulli | 345/835 |
| 5,787,403 A | 7/1998 | Randle | 235/380 |
| 5,806,085 A | 9/1998 | Berliner | 711/113 |
| 5,812,754 A | 9/1998 | Lui et al. | 714/6 |
| 5,835,959 A | 11/1998 | McCool et al. | 711/171 |
| 5,842,211 A | 11/1998 | Horadan et al. | 705/43 |
| 5,909,689 A | 6/1999 | Van Ryzin | 707/1 |
| 5,913,028 A | 6/1999 | Wang et al. | 709/203 |
| 5,926,833 A | 7/1999 | Rasoulian et al. | 711/124 |
| 5,943,688 A | 8/1999 | Fisher et al. | 711/162 |
| 5,950,203 A | 9/1999 | Stakutis et al. | 707/10 |
| 5,983,318 A | 11/1999 | Willson et al. | 369/30.31 |
| 5,999,930 A * | 12/1999 | Wolff | 707/10 |
| 6,035,351 A | 3/2000 | Billings et al. | 360/48 |
| 6,067,545 A | 5/2000 | Wolff | 370/238 |
| 6,081,883 A | 6/2000 | Popelka et al. | 711/111 |
| 6,084,892 A | 7/2000 | Benash et al. | 370/401 |
| 6,085,246 A | 7/2000 | Brandt et al. | 709/203 |
| 6,173,293 B1 * | 1/2001 | Thekkath et al. | 707/201 |
| 6,353,898 B1 * | 3/2002 | Wipfel et al. | 707/10 |
| 6,389,420 B1 * | 5/2002 | Vahalia et al. | 707/10 |
| 6,425,005 B1 * | 7/2002 | Dugan et al. | 709/223 |

FOREIGN PATENT DOCUMENTS

| | | |
|---|---|---|
| EP | 0 507 503 A2 | 7/1992 |
| EP | 0 664 506 A2 | 7/1995 |
| EP | 0 312 786 B1 | 12/1995 |
| EP | 0 460 602 B1 | 3/1998 |
| EP | 0 566 895 B1 | 5/1999 |
| JP | 1008433 | 1/1989 |
| JP | 05181735 | 7/1993 |
| WO | WO 89/10594 | 11/1989 |
| WO | WO 93/08530 | 4/1993 |
| WO | WO 94/18630 | 8/1994 |
| WO | WO 95/21416 | 8/1995 |
| WO | WO 95/23376 | 8/1995 |

OTHER PUBLICATIONS

Boku, T. "The technology of cache and virtual storage," Joho Shori (Japan) Vol. 33, No. 11 (Nov. 1992) pp. 1348–1357.

Corbett, Peter F., et al. "The Vesta Parallel File System," ACM Transactions on Computer Systems Vol. 14, No. 3 (Aug. 1996) pp. 225–264.

"Dynamically Partitioning DASD Storage Among Concurrent Processes," IBM Technical Disclosure Bulletin Vol. 36, Pub. No. 2 93A 60360 (Feb. 1993).

Fach, R., et al. "A Fast Storage Method for Disc Files," Rechentechnik Datenverarbeitung Vol. 16, No. 1 (Jan. 1979) pp. 13–14.

Malinconico, S. Michael. "Mass Storage Technology and File Organization," Journal of Library Automation Vol. 13 No. 2 (Jun. 1980) pp. 77–87.

Myslewski, Rik, et al. "The Future of Storage," MacUser (May 1997) pp. 62–69.

Nagatani, Kazuyuki. "Compact Mass Storage Subsystem with Magnetic Tape Auto–handling," Japan Telecommunication Review Vol. 28 No. 3 (Jul. 1986) pp. 205–210.

Pezarro, M. T. "A note on estimating hit ratios for direct–access storage devices," The Computer Journal Vol. 19 No. 3 (Aug. 1976) pp. 271–272.

Phillips, Barry. "Have Storage Area Networks Come of Age?" Computer (Jul. 1998) pp. 10–12.

Poultney, John. "Alternative LANs push multimedia speed limits," MacWeek Vol. 9 No. 28 (Jul. 07, 1995) pp. 16 and 18.

"Relative Block Addressing in an Advanced Technology Integrated Device Electronics File Subsystem," IBM Technical Disclosure Bulletin Vol. 36, Pub. No. 9B 93A 62384 (Sep. 1993).

Soltis, Steven R. "The Design and Implementation of a Distributed File System based on Shared Network Storage," Ph.D. Thesis (University of Minnesota) Aug. 1997.

Zimmerman, J. et al. "Design, Implementation and Management of Rules in an Active Database System," Database and Expert Systems Applications, 7th International Conference DEXA '96 Proceedings, Berlin 1996, pp. 422–435.

"Sonic Solutions Debuts Sonic Lightspeed; High–performance Fibre Channel–based Storage System for Media Worksgroups Speeds Professional Video and Audio Production," Business Wire (Sep. 10, 1998) p. 09100250 (Dialog Search Result printout).

"Dolby Laboratories and Sonic Solutions announce certification of Sonic DVD Creator Dolby Digital Encoder; First workstation–based digital audio encoder to receive Dolby approval," Business Wire (Jun. 25, 1997) p. 09250008 (Dialog Search Result printout).

"Sonic Debuts Premastering System for DVD 1.0 Enables Production Facilities to Begin Full–Scale DVD Production," Business Wire (Sep. 19, 1996), p. 09190025 (Dialog Search Result printout).

"Apple and IBM Join Sonic Solutions DVD Production Alliance Preparing DVD Titles for Multimedia PC Playback," Business Wire (Sep. 11, 1996), p. 09110163 (Dialog Search Result printout).

"Sonic Solutions Announces Collaboration with Nexus and NPR; Will Deliver Integrated Workgroup Tools for Radio Broadcast," Business Wire (May 13, 1996) p. 05130183 (Dialog Search Result printout).

"Sonic Solutions Debuts Sonic Lightspeed; High–performance Fibre Channel–based Storage Systems for Media Workgroups Speeds Professional Video and Audio Production," Business Wire (Sep. 10, 1998) (Dialog Search Result printout).

"Dolby Laboratories and Sonic Solutions announce certification of Sonic DVD Creator Dolby Digital Encoder; First workstation–based digital audio encoder to receive Dolby approval," Business Wire (Jun. 25, 1997) p. 6250008 (Dialog Search Result printout).

Birkmaier, Craig. "Distributed File Sharing: Medianet and SCSI–Net Facilitate Work . . . ," Videography Vol. 20 No. 4 (Apr. 1995) p. 52(3) (Dialog Search Result printout).

"Highlights from the exhibition . . . " Seybold Report on Publishing Systems Vol. 25 No. 2 (Sep. 18, 1995) p. S10(29) (Dialog Search Result printout).

"Transmitting large color files . . . " Seybold Report on Publishing Systems Vol. 24 NO. 3 (Oct. 26, 1994) p. T60(5) (Dialog Search Result printout).

"Hardware: platforms and products . . . " Seybold Report on Publishing Systems Vol. 23 No. 16 (May 10, 1994) p. S78(4) (Dialog Search Result printout).

"Apple and IBM Join Sonic Solutions DVD Production," M2 Presswire (Sep. 12, 1996) (Dialog Search Result printout).

Garvey, Martin J. "The Network is the Storage—Faster, cheaper, easier than conventional Unix servers, dedicated 'filer' are catching on with demanding users," Informationweek No. 661 (1997) p. 131 (Dialog Search Result printout).

"All Roads Lead to Resellers as Solutions Vehicle," Computer Reseller News No. 766 (1997) p. 184 (Dialog Search Result printout).

Wirbel, Loring. "Networking Equipment—Gadzoox networks' denali bridges two worlds—Fibre Channel arbitrated–loop switch unveiled," Electronic Engineering Times No. 982 (1997) p. 88 (Dialog Search Result printout).

Carr, Jim. "Fibre Channel—VARs turn to Fibre Channel for bandwidth on the back end," Varbusiness No. 1320 (1997) p. 171 (Dialog Search Result printout).

Wirbel, Loring., "Standard shows signs of market maturity—Fibre Channel expands from loop to switch apps," Electronic Engineering Times No. 980 (1997). p. 20 (Dialog Search Result printout).

Garvey, Martin J. "Enterprise Computing—High–Fiber Storage—Fibre Channel is changing the face of storage–and attracting big–name vendors," Infomationweek No. 653 (1997) p. 18 (Dialog Search Result printout).

MacLellan, Andrew. "Compaq selects HP's Fibre Channel chip for its new servers", Electronic Buyer's News No. 1070 (1997) p. 10 (Dialog Search Result printout).

"Brocade SilkWorm," Computer Reseller News No. 731 (1997) p. 73 (Dialog Search Result printout).

Spang, Kelly. "Fibre Channel collaboration—Vendors team up to offer starter kit network operating system," Lotus Vol. 6 No. 9 (Sep. 1990) p. 52(4) (Dialog Search Result printout).

Lazar, Jerry. "Optimem Adds Optical Jukebox," Computer Systems News No. 510 (1991) p. 23 (Dialog Search Result printout).

"Mgm't for Netware," Communicationsweek No. 374 (1991) p. 13 (Dialog Search Result printout).

"Vixel–Arcxel Merger Adds Competitioni to Fibre Switch Market," Computergram International No. 3363 (Mar. 9, 1998) p. CGN03090006 (Dialog Search Result printout).

"Gaszoox expands storage area network product offerings," Network vol. 13 No. 3 (Feb. 1998) p. 119 (1) (Dialog Search Result printout).

Kingsley, Lawrence. "Networking update: get off your haunches . . . " Seybold Report on Internet Publishing vol. 2 No. 3 (Nov. 1997) p. 20(5) (Dialog Search Result printout).

"Fibre Channel: Norwest Venture Capital invests $5.8 million in Brocade Communications," EDGE: Work–Group Computing Report vol. 8 (Dec. 8, 1997) p. 15 (1) (Dialog Search Result printout).

Wirbel, Loring. "Fibre channel arbitrated–loop switch unveiled." Electronic Engineering Times No. 982 (Nov. 24, 1997) p. 88 (1) (Dialog Search Result printout).

"Comdex show—a bountiful presentation." Electronic News vol. 43 No. 2195 (1991) p. 70 (1) (Dialog Search Result printout).

"Networking Roundup—Gadzoox Intros Denali Area Switch," Newsbytes (Nov. 11, 1997) p. NEW11110012 (Dialog Search Result printout).

"Fibre Channel: HP and Crossroads sign Fibre Channel–to–SCSI agreement." EDGE: Work–Group Computing Report vol. 8 (Nov. 3, 1997) p. 14(1) (Dialog Search Result printout).

Pendery, David. "Storage market finds Fibre." InfoWorld vol. 19 No. 38 (Sep. 22, 1997) p. 45(1) (Dialog Search Result printout).

"Fibre Channel: Brocade unveils the industry's first Fibre Channel gigabit switch that will allow users to build a Fabric for the emerging server–storage area network," EDGE: Work–Group Computing Report vol. 8 (Mar. 31, 1997) p. 2(1) (Dialog Search Result printout).

"Networking Roundup—Gigabit–Speed Fibre Channel Starter Kit." Newsbytes (Mar. 6, 1997), p. NEW03060012 (Dialog Search Result printout).

"PC storage grows up," IBM System User vol. 15 No. 7 (Jul. 1994) p. S31(4) (Dialog Search Result printout).

Eckerson, Wayne. "IBM, Oracle lead software firms in UniForum debuts," Network World vol. 10 No. 12 (Mar. 22, 1993) p. 6(1) (Dialog Search Result printout).

Bass, Brad. "Agencies explore storage for LANs," Federal Computer Week vol. 6 No. 36 (Dec. 7, 1992) p. 36(2) (Dialog Search Result printout).

Sullivan, Kristina B. "Show spotlight falls on CD ROM; DEC, others unveil drives, software at CD–ROM Expo," PCWeek vol. 8 No. 42 (Oct. 21, 1991) p. 29(2) (Dialog Search Result printout).

"Storage systems," LAN Times vol. 8 No. 16 (Aug. 26, 1991) p. 241(9) (Dialog Search Result printout).

Lawrence, Bill. "Introduction to Novell NetWare: learn the essentials of the leading network operating system," Lotus vol. 6 No. 9 (Sep. 1990) p. 52(4) (Dialog Search Result printout).

Brennan, Laura. "Users' disk wishes are coming true: smaller, lower priced, more memory," PCWeek Vol. 4 No. 43 (Oct. 27, 1987) p. 140(2) (Dialog Search Result printout).

Jones, Del. "Advances in massive storage mean increased benefits for local networks," PCWeek Vol. 4 No. 39 (Sep. 29, 1987) p. C29(1) (Dialog Search Result printout).

Axner, David. "Gibabit Ethernet: a technical assessment," Telecommunications Vol. 31 No. 3 (Mar. 1997) p. 31(4) (Dialog Search Result printout).

"1996 Index," LAN Magazine Vol. 11 No. 13 (Dec. 1996) p. 149(10) (Dialog Search Result printout).

Streeter, April. "New Gigabit Ethernet gains industry support," MacWEEK Vol. 10 No. 40 (Oct. 21, 1996) p. 28(2) (Dialog Search Result printout).

Wong, William. "Switching to switching . . . " Network VAR Vol. 4 No. 5 (May 1996) p. 35(6) (Dialog Search Result printout).

Shipley, Buddy. "Ethernet's endurance contest," LAN Magazine Vol. 11 No. 5 (May 1996) p. 67(9) (Dialog Search Result printout).

Kjos, Todd J. et al. "Hardware cache coherent input/output . . . " Newlett–Packard Journal Vol. 47 No. 1 (Feb. 1996) p. 52(8) (Dialog Search Result printout).

Correia, Edward J. "Technology Closeup: Lighting the Way to Super–Fast 'Storage–Networks'—How Fiber Channel sets the wire ablaze," Computer Reseller News No. 762 (1997) p. 244 (Dialog Search Result printout).

Miastkowski, Stan. "Switching to the Future—The Latest generation of Fast Ethernet switches offers solutions to fit your company and budget," Communicationsweek No. 658 (1997) p. 56 (Dialog Search Result printout).

Medford, Casismir. "Switching Customers to Fast Ethernet, Now—Despite many choices, switched Fast Ethernet is the bread–and–butter solution today," VARBusiness No. 1120 (1995) p. 67 (Dialog Search Result printout).

Cohen, Jodi. "Nbase fires starting gun in race for gigabit Ethernet," Network World (May 27, 1996) p. 1 (Dialog Search Result printout).

Valentino, George J. et al. "The incorporation of Fibre Channel and Scalable Coherent Interface technologies in avionics subsystems," AIAA/IEEE Digital Avionics Systems Conference (DASC) 15$^{th}$, Atlanta, GA (Oct. 27–31, 1996) Proceedings (1996) p. 365–372 (Dialog Search Result printout).

Diefendorff, Keith. "K7 Challenges Intel . . . " Microprocessor Report Vol. 12 No. 14 (Oct. 26, 1998) (Dialog Search Result printout).

Diefendorff, Keith. "Jalapeno Powers Cyrix's M3," Microprocessor Report Vol 12 No. 15 (Nov. 16, 1998) (Dialog Search Result printout).

Barker, Ralph. "SGI's Origin 2000 server," UNIX Review's Performance Computing Vol. 16 No. 11 (Oct. 1998) p. 49(7) (Dialog Search Result printout).

Barker, Ralph. "Auspex Netserver 7000 Model 810: With much of the competition endorsing file serve–specific, microkernel Oss, can a SPARC and Solaris–based system shine at the high end?" UNIX Review's Performance Computing Vol. 16 No. 9 (Aug. 1998) p. 41(6) (Dialog Search Result printout).

Wong, William. "Using high–end microprocessor servers," Network VAR Vol. 6 No. 1 (Jan. 1998) p. 42(5) (Dialog Search Result printout).

Lewis, Ric L. et al. "Delivering PCI in HP B–class and C–class workstations: a case study in the challenges of interfacing with industry standards," Hewlett–Packard Journal Vol. 49 No. 2 (May 1998) p. 51(11) (Dialog Search Result printout).

Bournellis, Cynthia. "Sun to put heat on storage market," Electronic News Vol. 44 No. 2204 (Feb. 2, 1998) p. 2(2) (Dialog Search Result printout).

Schweber, Linda Von et al. "SuperHIPPI turns on power," PCWeek Vol. 15 No. 4 (Jan. 26, 1998) p. 85(2) (Dialog Search Result printout).

"Silicon Graphics Regards its S2MP Scalable Shared Memory Multiprocessor as Answer to Bus Bandwidth Limits," Comptergram International No. 3024 (Oct. 21, 1996) p. CGN10210005 (Dialog Search Result printout).

Morgenstern, David. "No rest for FireWire," MacWEEK Vol. 10 No. 38 (Oct. 7, 1996) p. 4(2) (Dialog Search Result printout).

"Despite having a full set of technologies, Sun settles for a simplified non–uniform memory architecture," Computergram International No. 942 (Jun. 26, 1996) p. CGN06260009 (Dialog Search Result printout).

Kjos, Todd J. et al. "Hardware cache coherent input/output," Hewlett–Packard Journal Vol. 47 No. 1 (Feb. 1996) p. 52(8) (Dialog Search Result printout).

"Sun users LSI logic CMOS chip set in S3.MP serial link to build high–speed interconnect for thousands of nodes," Computergram International (Aug. 30, 1995) p. CGN08300010 (Dialog Search Result printout).

"Tandem looks to servernet to be the McGuffin that keeps it ahead of the pack," Computergram International (Jul. 20, 1995) p. CGN07200008 (Dialog Search Result printout).

Turley, James L. "Literature watch," Microprocessor Report Vol. 8 No. 15 (Nov. 14, 1994) p. 26(1) (Dialog Search Result printout).

Boyd–Merritt, Rick. "PCI follow–on targets servers, switches—Gigabit bus carries Intel to comm turf," Electronic Engineering Times No. 997 (1998) p. 1 (Dialog Search Result printout).

Runyon, Stan. "ATE industry reinventing itself for systems–on–a–chip," Electronic Engineering Times No. 964 (1997) p. 18 (Dialog Search Result printout).

Dillon, Nancy. "IBM's Seascape not quite to shore," Computerworld (Feb. 16, 1998) p. 57 (Dialog Search Result printout).

Murata, S. et al. "Wide–area distributed diaster–tolerant file system for multimedia data storage," Proceedings of the SPIE—The International Society for Optical Engineering Conference Vol. 3312 (1997) p. 330–8 (Dialog Search Result printout).

Iwanchuk, Russ. "Lighten your load—The Net App F760 helps you off–load your file services and free your network storage," PC Magazine Vol. 18 No. 1 (Jan. 5, 1999) p. 77 (Dialog Search Result printout).

"Sequent Ships Cluster File System, Fibre Channel Switch," Computergram International No. 3308 (Dec. 9, 1997) p. CGN12090007 (Dialog Search Result printout).

Chowdhry, Pankaj. "The Ferrari of file transfers," PC Week Vol. 14 No. 49 (Nov. 24, 1997) p. 91 (Dialog Search Result printout).

"Sun Ships First Phase of Full Moon Clustering and Presses Advantages of High Availability," Computergram International No. 3259 (Oct. 2, 1997) p. CGN10020012 (Dialog Search Result printout).

Alexander, George et al. "Data communications aids," Seybold Report on Publishing Systems Vol. 26 No. 21 (Aug. 4, 1997) p. 45 (Dialog Search Result printout).

Baker, Steven. "NFS and network performance on Unix," UNIX Review Vol. 15 No. 10 (Sep. 1997) p. 17 (Dialog Search Result printout).

Fawcett, Neil. "Rhubarb and clusters," Computer Weekly (May 22, 1997) p. 48 (Dialog Search Result printout).

Grein, Randy. "Where RAID excels," Network VAR Vol. 5 No. 2 (Feb. 1997) p. 40 (Dialog Search Result printout).

Parker, Tim. "HP raises the Ante," HP Professional Vol. 11 No. 2 (Feb. 1997) p. 22 (Dialog Search Result printout).

"Fibre Channel: Brocade and Prisa Networks announce customer agreement to deliver the SilkWorm switch for production, post–production and broadcast facilities," EDGE: Work–Group Computing Report Vol. 8 (Apr. 14, 1997) p. 22 (Dialog Search Result printout).

"Moscow Focus: Tricord Systems, Inc.," Computergram International No. 3135 (Apr. 8, 1997) p. 13 (Dialog Search Result printout).

De Nike, Kristina et al. "The future of storage," MacUser Vol. 13 No. 5 (May 1997) p. 62 (Dialog Search Result printout).

"Storage: ImpactData introduces new storage architecture for high performance computing," EDGE: Work–Group Computing Report Vol. 7 (Nov. 18, 1996) p. 26 (Dialog Search Result printout).

Lomb, Reiner et al. "Storage management solutions for distributed computing environments," Hewlett–Packard Journal Vol. 47 No. 5 (Oct. 1996), p. 81 (Dialog Search Result printout).

Poultney, John. "Pluto to spin Ultra SCSI–3 Space array," MacWEEK Vol. 10 No. 46 (Dec. 2, 1996) p. 8 (Dialog Search Result printout).

Katz, Bill. "Application servers: the power of four," PC Magazine Vol. 15 No. 18 (Oct. 22, 1996) p. 197 (Dialog Search Result printout).

"Network Management," LAN Magazine Vol. 11 No. 10 (Sep. 15, 1996) p. 201 (Dialog Search Result printout).

Dipirro, Steve. "OpenVMS: the next generation," Digital Age Vol. 15 No. 9 (Sep. 1996) p. 16 (Dialog Search Result printout).

"Literature watch," Microprocessor Report Vol. 10, No. 6 (May 6, 1996) p. 24 (Dialog Search Result printout).

"Storage: new subsystem paradigm looms on the horizon," EDGE: Work–Group Computing Report Vol. 7 No. 307 (Apr. 1, 1996) p. 2 (Dialog Search Result printout).

"Network management," LAN Magazine Vol. 10 No. 10 (Oct. 15, 1995) p. 201 (Dialog Search Result printout).

"HP to show SMP servers with PA–8000 migration," Electronic News Vol. 41 No. 2058 (Mar. 27, 1995) p. 20 (Dialog Search Result printout).

"Unix multiprocessing: HP 9000 K–class server for commercial & technical environments; powerful, highly expensive symmetric multiprocessing platform design offers unprecedented midrange performance," EDGE, on & about AT&T Vol. 10 No. 349 (Apr. 3, 1995) p. 50 (Dialog Search Result printout).

Fellows, William. "IBM RS/6000 announcements: AIX enhancements, DB2/6000 2.0 in beta," Computergram International (Jun. 16, 1994) p. 14 (Dialog Search Result printout).

Gengler, Barbara. "Sun strategy emphasizes storage," LAN Computing Vol. 5 No. 4 (Apr. 1994), p. 7 (Dialog Search Result printout).

"1993 at a glance," LAN Magazine Vol. 8 No. 13 (Dec. 1993) p. 205 (Dialog Search Result printout).

"IBM RISC announcements: the collaborative PowerParallel box . . . " Computergram International (Mar. 12, 1993) p. 12 (Dialog Search Result printout).

Stratton, Lynn. "IBM mobilises its RS/6000 RISC to power its entry into parallel supercomputer market," Computergram International (Feb. 23, 1993) p. 7 (Dialog Search Result printout).

"Chips: Protocol Engines chooses HP VLSI foundry; fabrication of Protocol Engine chipset begins," EDGE Work–Group Computing Report Vol. 3 No. 90 (Feb. 10, 1992) p. 31 (Dialog Search Result printout).

Moozakis, Chuck. "Xelus Plans New Storage Architecture," Internetweek No. 694 (1997) p. 37 (Dialog Search Result printout).

Harbaugh, Logan. "NT 5.0 Shows Promise—Beta 1 provides a look at features in the upcoming operating system, including Active Directory service and support for new hardware standards," Informationweek No. 659 (1997) p. 69 (Dialog Search Result printout).

"Methodology," Computer Reseller News No. 762 (1997) p. 248 (Dialog Search Result printout).

Rash, W. et al. "NT 5.0 Beta Hits the Streets," Internetweek No. 684 (1997) p. 20 (Dialog Search Result printout).

Gage, D. "Sun launches next step in Full Moon," Computer Reseller News No. 757 (1997) p. 36 (Dialog Search Result printout).

Moozakis, C. "NT 5.0 to address key storage issues," Internetweek No. 683 (1997) p. 9 (Dialog Search Result printout).

Yoshida, J. "DTV task force tackles networked multimedia—Global group weighs proposed technologies from five parties," Electronic Engineering Times No. 965 (1997) p. 1 (Dialog Search Result printout).

"Shared Storage," VARBusiness No. 1311 (1997) p. 132 (Dialog Search Result printout).

Wirbel, Loring. "Communications Hardware—Switch/server links grab Gbit spotlight," Electronic Engineering Times No. 941 (1997) p. 41 (Dialog Search Result printout).

Covell, Andy et al. "LIVE! From your Network—The Big Picture: 3 Low–End Internet Video Servers: Plus 4 Sneak Peeks at LAN/Campus High–Bandwidth Video Servers," Network Computing No. 716 (1996) p. 60 (Dialog Search Result printout).

Conover, Joel. "ATM, Fast Ethernet, Fibre Channel–Fast, Fast: 26 of the Hottest Fastest Network Interface Cards Tested in our University of Wisconsin Labs," Network Computing No. 164 (1995), p. 46 (Dialog Search Result printout).

Rizzo, Tony. "Going Fast, Faster and Fastest," Network Computing No. 614 (1995) p. 14 (Dialog Search Result printout).

"Client–Server Applications," Open Systems Today No. 132 (1993) p. 68 (Dialog Search Result printout).

DeVoney, Chris. "Product Review," Compterworld (Oct. 6, 1997) p. 124 (Dialog Search Result printout).

Gittlen, Sandra. "Company ditches Digital Unix platform in favor of Sun's," Network World (Jun. 30, 1997) p. 17 (Dialog Search Result printout).

Cohen, Judi. "Gigabit Ethernet Grabs Spotlight at Interop," Network World (May 12, 1997) p. 27 (Dialog Search Result printout).

Heskett, Ben. "Storage vendors provide fast data access," Network World (May 27, 1996) p. 27 (Dialog Search Result printout).

Dornbusch, Margaret. "Sentinel Systems makes its move into superserver market," Network World (Nov. 21, 1994) p. 29 (Dialog Search Result printout).

MacAskill, Skip. "Hollywood gives FDDI more than a bit part," Network World (Jan. 10, 1994) p. 1 (Dialog Search Result printout).

* cited by examiner

TERM-BASED METHODS AND APPARATUS FOR ACCESS TO FILES ON SHARED STORAGE DEVICES

This application is a continuation-in-part U.S. patent application Ser. No. 09/309,453, filed on May 11, 1999 now U.S. Pat. No. 6,161,104, which is a continuation of U.S. patent application Ser. No. 09/002,266, filed on Dec. 31, 1997, which issued on Sep. 7, 1999, as U.S. Pat. No. 5,950,203, the teachings of all of which are incorporated herein by reference.

BACKGROUND OF THE INVENTION

The invention pertains to digital data processing and, more particularly, to the sharing of disk drives and other storage devices on a networked digital data processing system. The invention has application, for example, in the processing of video, graphics, database and other files by multiple users or processes on a networked computer system.

In early computer systems, long-term data storage was typically provided by dedicated storage devices, such as tape and disk drives, connected to a central computer. Requests to read and write data generated by applications programs were processed by special-purpose input/output routines resident in the computer operating system. With the advent of "time sharing" and other early multiprocessing techniques, multiple users could simultaneously store and access data—albeit only through the central storage devices.

With the rise of the personal computer and PC-based workstations in the 1980's, demand by business users led to development of interconnection mechanisms that permitted otherwise independent computers to access one another's storage devices. Though computer "networks" had been known prior to this, they typically permitted only communications, not storage sharing.

Increased power of personal computers and workstations is now opening ever more avenues for their use. Video editing applications, for example, have until recently demanded specialized video production systems. Now, however, such applications can be run on high-end personal computers. By coupling these into a network, multiple users can share and edit a single video work. Reservation systems and a host of other applications also commonly provide for simultaneous access to large files by multiple parties or processes. Still other tasks may require myriad small files to be accessed by multiple different parties or processes in relatively short or overlapping time frames.

Network infrastructures have not fully kept pace with the computers that they interconnect. Though small data files can be transferred and shared quite effectively over conventional network interconnects, such as Ethernet, these do not lend themselves, for example, to sharing of large files. Thus, although users are accustomed to seemingly instantaneous file access over a network, it can take over an hour to transfer a sixty second video file that is 1.2 GBytes in length.

Some interconnects permit high-speed transfers to storage devices. The so-called fiber channel, for example, affords transfers at rates of up to 100 MBytes/sec—more than two orders of magnitude faster than conventional network interconnects. Although a single storage device may support multiple fiber channel interfaces, the industry has only recently set to developing systems to permit those workstations to share such files on a storage device. Moreover, when a file is to be accessed by multiple users, the overhead of server intervention can result in loss of speed advantages and efficiencies otherwise gained from the high-speed interface. In this regard, techniques such as locking, maintaining ghost files, monitoring file changes and underking multi-step access, check-in or housekeeping operations may be unworkable when multi-user access to many small files must be provided quickly.

In many situations, and for many specific types of networks, the coherence and security of a centralized shared access system are desirable, but the nature of their storage transactions may be ill-suited to permitting shared access due for example, to the burden imposed by file management protocols for tracking files, versions, and file size changes, and so forth.

In view of the foregoing, an object of the invention is to provide improved digital data processing systems and, particularly, improved methods and apparatus of high-speed access to data in storage devices on a networked computer system.

A related aspect of the invention is to provide such systems that achieve fast operation with files of diverse sizes.

A related aspect of the invention is to provide such systems as can be implemented with minimum cost and maximum reliability.

Yet another object of the invention is to provide such systems as can be readily adapted to pre-existing data processing and data storage systems.

Yet still another object of the invention is to provide such systems as can be readily integrated with conventional operating system software and, particularly, conventional file systems and other input/output subsystems.

SUMMARY OF THE INVENTION

One or more of the foregoing and other desirable objects are attained by the invention, which provides novel term- or lease-based methods and apparatus for accessing shared storage on a networked digital data processing system.

A system according to one aspect of the invention includes a plurality of digital data processing nodes and a storage device, e.g., a disk drive, a "jukebox," other mass storage device or other mapped device (collectively referred to herein after as "disk drive," "storage device" or "peripheral device"). First and second ones of the nodes, which may be a client and a server node, respectively, are coupled for communication over a LAN, network or other communications pathway. Both the first and the second nodes are in communications with the storage device. This can be over the same or different respective logical or physical communications pathways.

By way of non-limiting example, the first node and the second node can be a client and a server, respectively, networked by Ethernet or other communications media, e.g., in a wide area network, local area network, the Internet interconnect, or other network arrangement. The server and/or client can be connected to the storage device via a SCSI channel, other conventional peripheral device channel, such as a fibre channel, "firewire" (i.e., IEEE 1394 bus), serial storage architecture (SSA) bus, high-speed Ethernet bus, high performance parallel interface (HPPI) bus or other high-speed peripheral device bus.

A file system or other functionality in the second (server) node receives and responds to at least selected requests— e.g., file OPEN requests—from the first (client) node for access to a file on the storage device, by generating a "lease". The lease includes a block map or other administrative data (referred to elsewhere herein as "meta data") for the requested file, as well as an expiry time indicating how long the administrative data is valid.

Upon grant of the lease, the client node accesses the storage device using the block map or other administrative data supplied with the lease. The server node assures that this administrative data remains valid for the period of the lease, e.g., such that list and order of blocks comprising the file does not change—e.g., shrink, disappear or become reassigned to other files, during the client's use of the file. Correspondingly, the client node ceases utilization of the administrative data (and, presumably, ceases at least direct access of the file) after lease expiry.

Related aspects of the invention provide a system as described above in which lease expiry is keyed to the time of the initial client request. Hence, both the client and server nodes can accurately determine lease expiry time by reference to their own clocks; network time synchronization is therefore not necessary for effective operation of the system.

Further aspects of the system provide a system as described above in which the client issues a request for read-only or a read/write access to the file, and in which the server node grants a corresponding lease. For read/write leases, the server effects defragmentation, clean-up or other administration of the file once the lease has expired, e.g., via the server file system or via a file management system or controller on the storage device. The server node can also monitor activity by read/write "leaseholders," e.g., for rapid notification of meta data changes upon expiry of the lease.

Typically, no such administration is required at termination of a read-only lease, since the leaseholder makes no changes to the file. Thus, for read-only access requests that may often constitute the vast preponderance of file requests, only the initial request and lease grant messages are necessary to allow quick and unhindered file access.

Still further aspects of the invention provide a system as described above in which the leases are self-expiring. Client node leaseholders in such a system need not report back to the server when a lease is expired and/or the file is closed. This reduces the number messages required to be communicated over the network between nodes, while providing direct access to file storage and continuing file security and coherence.

In an alternate aspect of the invention, the client node tracks lease expiry time and assures that all file writes are completed and changes in end-of file pointers are reported to the server node before lease expiry. Thus, only in this circumstance is a second or further communication over the network between the client and server required. The client node file application also assures that the leased data map is not referenced after lease expiry, and may, for example cleanse its cache of stale data.

Yet other aspects of the invention provide systems as described above in which the server node employs a decision table to set lease intervals, based, for example on whether the request for file access is a read-only or read/write request, as well as on current average network transaction times, requested file size, number or types of outstanding unexpired leases for the requested file, and the like. For example a request to read a file under 50 kbytes may be automatically granted a ten-second, or a two-minute, lease, while large file read/write requests may be granted leases on the order of minutes or hours.

Yet other aspects of the invention provide a system as described above in which the server node locks and unlocks data blocks in order to assure compliance with leases by the client node and other nodes. According to these aspects of the invention, when a lease is granted for a set of data blocks, they are locked; when the lease expires, those data blocks are unlocked.

Monitoring of lease activity is facilitated, in related aspects of the invention, by the server node's maintenance of a list of outstanding (or unexpired) leases. The server uses this, for example, to track and control any file size changes. When all leases have expired for at least a given set of blocks, the server can issue an unlock message to the file management system for those blocks and permit them to be defragmented or otherwise administered to.

Still further aspects of the invention provide systems as described above in which the client ode accesses leased files directly, without intervention by the server node. In this regard, the latter unctions as an "authorizer" (i.e., insofar as it grants leases which effectively authorize access to a file) and not as a "server" per se (though, of course, it can function in the latter role as well). In related aspects, the server may be implemented as a layer over a native file management system in the storage device, interfacing with a native file system meta data controller (FSMDC).

Further aspects of the invention provide a system as described above operating with a shared storage file management system, for example, as described in the aforesaid United States patent, or with other conventional network file server system. The allows the client nodes to access the file system without extraneous network communications for most file access tasks while it may employ the network file server system to require access through a server or file management system for a limited number of file requests for large files, files with outstanding leases, and in situations where security, coherence or file integrity concerns are primary.

Further aspects of the invention provide systems as described above including multiple "client" nodes, one or more "server nodes" and one or more storage devices, all operating as described above.

Still further aspects of the invention provide methods of operating digital data processing systems paralleling the operations described above.

These and other aspects of the invention are evident in the drawings and in the description that follows.

BRIEF DESCRIPTION OF THE ILLUSTRATED EMBODIMENT

A more complete understanding of the invention may be attained by reference to the drawings, in which FIG. 1 depicts a storage area network of the type with which the invention may be practiced;

DETAILED DESCRIPTION OF THE ILLUSTRATED EMBODIMENT

Figure 1:
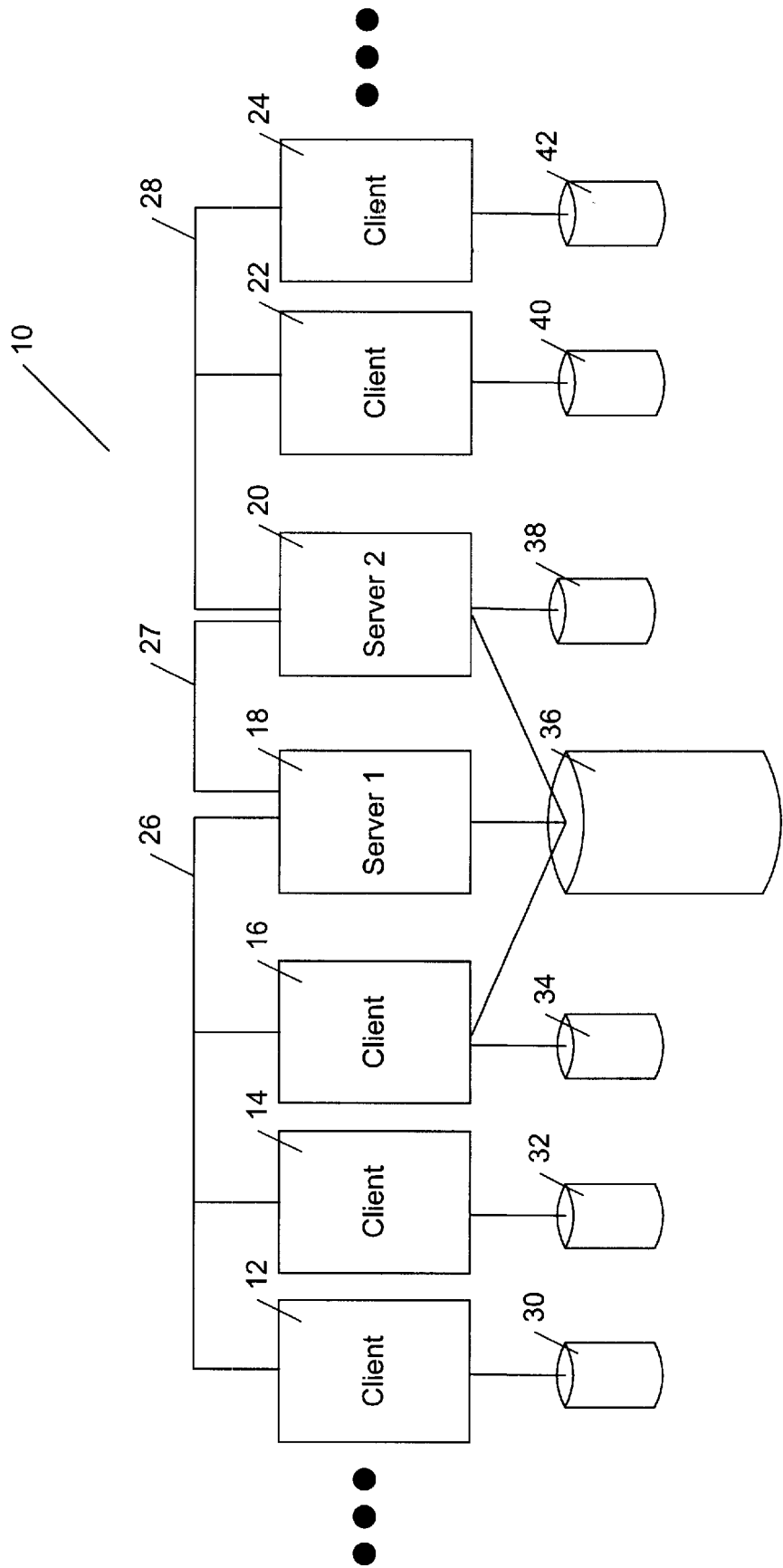

FIG. 1 depicts a scaleable networked digital data processing system of the type used to practice the invention. The system 10 includes a plurality of nodes 12–24, including two server nodes 18, 20 coupled via network pathways 26, 28 to client nodes 12–16 and 22–24, as shown. Server nodes 18, 20 are additionally coupled to one another via network pathway 27.

In the illustrated embodiment, nodes 12–24 represent digital data processing apparatus or other devices capable of being coupled to one another in a network and, more particularly, by way of example, in a client-server configuration. Illustrated server nodes 18, 20 represent mainframe computers, workstations, personal computers, or other digital data processing apparatus capable of providing server functions in such networks and, particularly, of controlling access to shared peripheral devices, such as storage device 36. Nodes 12–16 and 22–24 likewise represent workstations, personal computers, dedicated devices, or other digital data processing apparatus that generate requests for access to such shared peripheral devices.

The network pathways 26–28 represent wire cable interconnects, wireless interconnects, point-to-point interconnects, Internet interconnects or other digital communications interconnects of the type known in the art Those pathways can be configured in any configuration that permits a node 12–16, 20–24 requesting access to a shared peripheral device 36 to communicate that request to a node 18 controlling access thereto. For purposes hereof and unless otherwise evident from context, such a requesting node is referred to as a "client" regardless of its role (i.e., as a client or server) in the conventional network defined by nodes 12–18 and pathway 26, or nodes 20–24 and pathway 28. Thus, for example, node 18 could be a "client" to node 16 for purposes of sharing peripheral device 34, presuming an auxiliary connection (e.g., fiber channel) were provided between node 18 and that peripheral device.

In the illustrated embodiment, nodes 12–24 operate under the Microsoft Windows NT operating system, though those skilled in the art will appreciate that the nodes 12–24 may utilize other client and server operating systems, as well. Moreover, it will be appreciated that nodes need not utilize the same operating systems. Thus, for example, server 18 may operate as a Windows NT-based server, while server 20 operates as a UNIX-based server. The invention is therefore seen to have the advantage of permitting multiple nodes of different pedigrees, or operating system types, to access files on a common peripheral device.

With further reference to FIG. 1, the nodes 12–24 are coupled to respective dedicated storage devices 30–42, as shown. Such couplings are provided by SCSI channels or other device interconnects suitable for permitting the nodes to transfer information with such devices. In addition to being coupled to their own dedicated storage devices 34, 38, nodes 16, 20 are coupled to the storage device 36 that is controlled by node 18. In the parlance of the invention, nodes 16, 20 are referred to as "clients" and node 18 is referred to as a "server." Coupling between the clients 16, 20 and the shared peripheral device 36 can be provided by any conventional peripheral device interconnect, though, preferably, it is provided by high-speed interconnects such as fibre channel, "firewire" (i.e., IEEE 1394 bus), serial storage architecture (SSA) bus, high-speed Ethernet bus, high performance parallel interface (HPPI) bus or other high-speed peripheral device bus.

Figure 2:
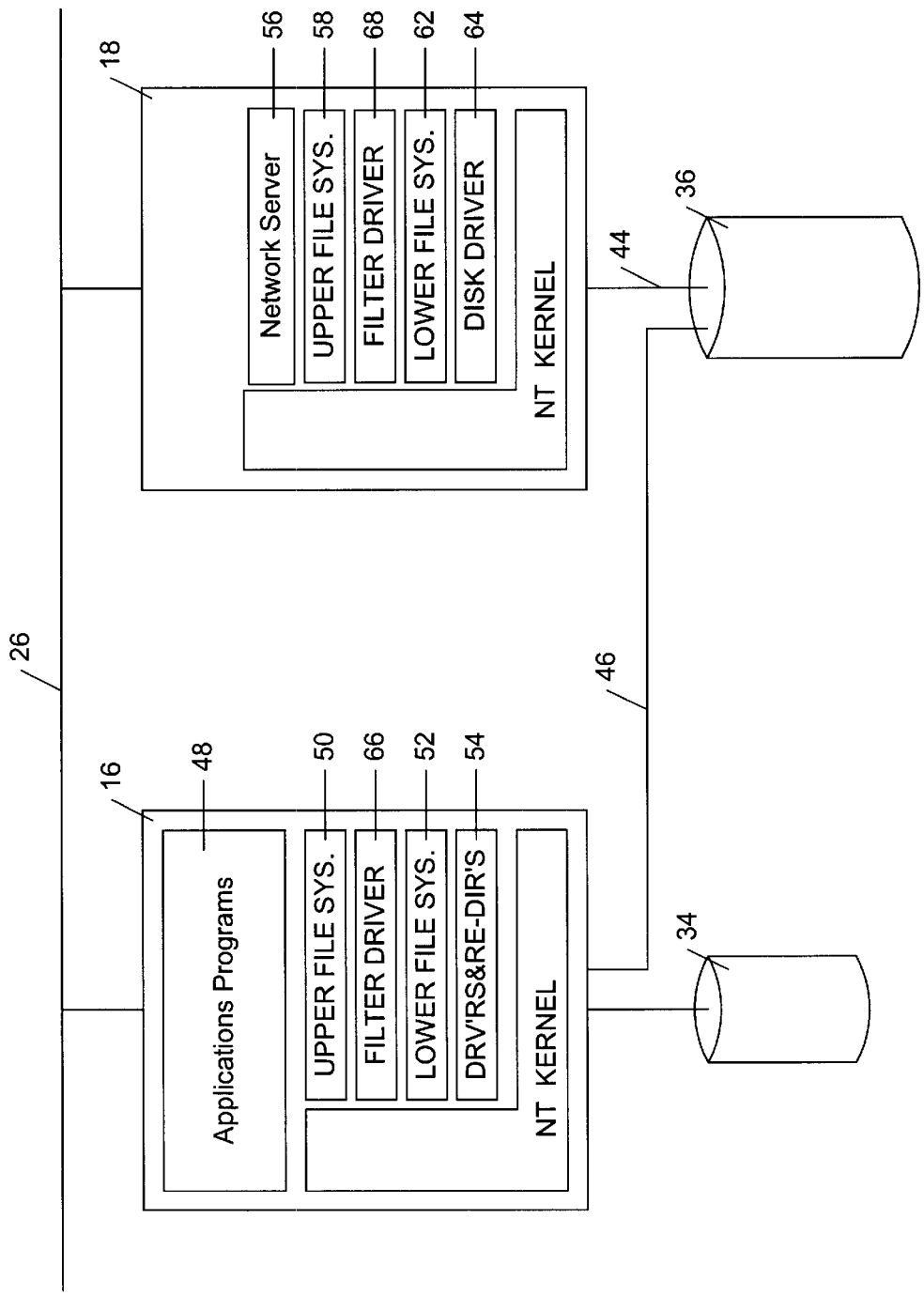
FIG. 2 depicts a software architecture of exemplary nodes in a system according to FIG. 1.

FIG. 2 depicts further detail of the hardware and software architecture permitting access to files on a shared peripheral device 36 by nodes 16, 20 in a system according to the invention. Though the discussion that follows is directed to access among these devices, those skilled in the art will appreciate that the teachings can be applied equally to file access on any of storage devices 30–32 by any of the nodes 12–24 to which they are directly or indirectly coupled.

Referring to the drawing, nodes 16, 18 are coupled to one another via communications pathway 26 and to peripheral device 36 via pathways 44, 46, respectively. As noted above, pathway 44 (coupling device 18 to peripheral 36) can be a SCSI channel or other conventional peripheral device interconnects. Likewise, as noted above, pathway 46 (coupling device 16 to peripheral 36) can be a conventional peripheral device interconnect, though, preferably, is a high-speed interconnect such as fibre channel, "firewire" (i.e., IEEE 1394 bus), serial storage architecture (SSA) bus, high-speed Ethernet bus, high performance parallel interface (HPPI) bus or other high-speed peripheral device bus.

Executing on node 16 are one or more applications programs 48 (e.g., including video editing programs, image analysis programs, and so forth) that generate requests for access to local and networked peripheral devices, including shared device 36. Those applications programs execute in the conventional manner under the control of an operating system, e.g., Windows NT, which includes a file system that services those access requests.

In the illustration, that file system is represented by elements 50–54, including "upper" file system 50, representing the Windows NT I/O Subsystem Manager and other components responsible for interfacing with applications programs 48 and for routing peripheral device access requests to the file system; "lower" file system 52, representing the Windows NT File system drivers and intermediate drivers and other components responsible for local, disk-based file systems, SCSI drivers and the like providing generic functionality to a common set of devices; and drivers 54, representing software (and hardware) components for transferring information to and from attached peripheral devices 34, 36.

Because node 16 is a client vis-a-vis the Windows NT network, the drivers also include a network redirector, such as the Windows NT LANManRedirector, that transfers access requests to and from the shared peripheral device 36 via server node 18 and pathways 26 and 44. The node 18, which includes network server component 56, handles such requests in the conventional manner of a server of a networked digital data processing system. As illustrated, node 18 also includes a file system, comprising elements 58–64, whose operations parallel those of components 50–54 on the node 16.

Though the illustrated architecture for node 16 is in accord with that dictated by Windows NT, those skilled in the art will appreciate that the invention may be embodied in devices running under other operating systems, as well.

Systems constructed and operated according to the invention allow multiple "client" nodes to access files on a shared peripheral device with minimal coordination of a "server" node for that device. A server node is used in this approach to store physical file mappings and other administrative information—and to otherwise administer—the shared device. A direct connection, or "directly attached disk connect," is also be provided however between each node and the shared device to permit certain operations, e.g., bulk reads and writes, to be accomplished directly between the nodes and the peripheral device. The illustrated embodiments provide this capability through communications pathways such as pathway 46 and through filter drivers 66, 68 incorporated into the file systems. The direct connection may be physically separate from the network connection provided between the nodes or it may be logically separate, e.g., carried by the same physical conductor set as the network connection via high-speed switches and/or pathways.

In the discussion that follows, unless otherwise evident from context, the term "file system" refers in this context to the combined operation of the nodes' native file systems (e.g., comprising elements 50–54 and 56–64) and of the network server, e.g., 56., and file system, e.g., 56–64, of the node to which the shared peripheral device is assigned and of the file system, e.g., 50–54 of the node that shares that device.

Figure 3:
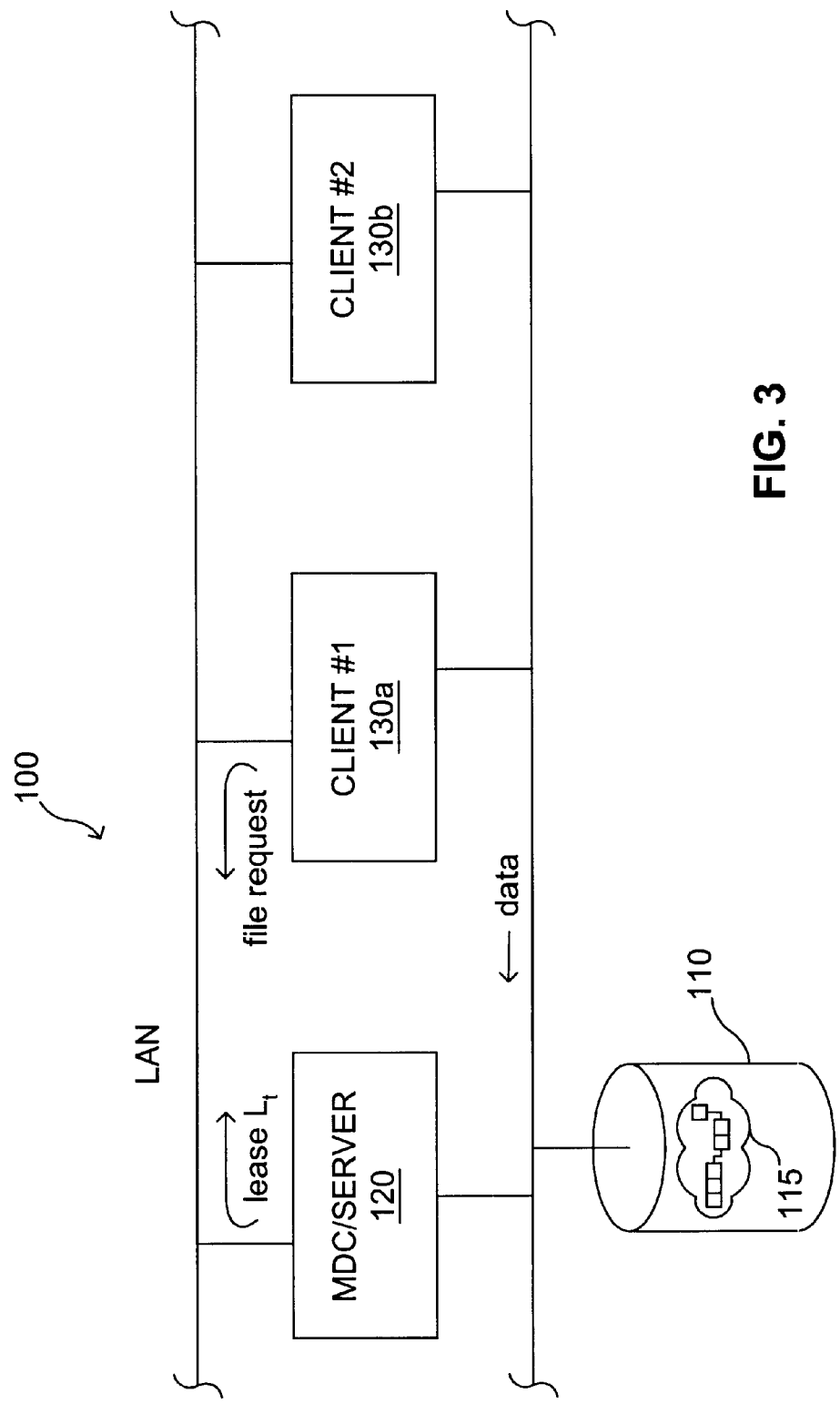
FIG. 3 depicts the issuance of a lease to a node in a system according to the invention.

FIG. 3 shows the basic structure of a file management system in accordance with the present invention. As illustrated, a meta data controller (MDC) or "server" 120 is associated with a storage device 110, and connected in a network 150 such as a LAN with a plurality of client nodes or workstations 130a, 130b, . . . Those skilled in the art will readily appreciate that server 120 corresponds, for example, to server 18 of FIG. 1; storage device 110, to peripheral device 36; network 150 to networks 26–28; and nodes 130a, 103b, . . . to client nodes 12–24.

The storage device 110 stores data, e.g., files, records, data structures, or other ordered data, any of which shall generically be referred to herein as a "file". One file 115 is illustrated schematically in device 110, occupying a number of blocks which, as shown, may be non-contiguous. In general, the file 115 will be denoted on the network 150 by a file name and certain identifying data that indicates how to retrieve it, e.g., a data path including the device, a directory, subdirectory etc. The actual storage location on the device 110 will be different, device-specific, and will vary as the file expands or contracts, is re-written, and then de-fragmented and reallocated to different storage locations within storage 110 during continuing operation, use and storage device housekeeping.

The MDC/server maintains the meta data for accessing the files on the storage device. As shown in FIG. 3, the server 120 responds to a request for a file transmitted over the network from a client 130a, by providing meta data, e.g., a file map, to the client 130a. The client uses this to accesses the storage device 110 directly.

In the illustrated embodiment, the file map is time-limited; a time is specified during which the client may rely on the meta data to use and access the file. Thus, the server passes a lease L(t) including a map and specifying a time t for which the map will be valid. The client 130 may accesses the file in storage without requiring further network communications to server 120 or coordination with other nodes on the network. File access may be effected over the network, which may for example have a direct switching connection to the storage device 110, or via a separate high speed bus or fiber line to the storage device 110.

The server, correspondingly, assures that the lease map remains valid for the lease term; i.e., that the block addresses in storage remain valid. Thus, the MDC 120 is a "server" in a limited sense; it provides meta data for accessing files, and sets the lease terms, thus affecting traffic, but it need not engage in exchanging multiple messages to either provide file contents or coordinate file changes and conflicting access requests.

Figure 4:
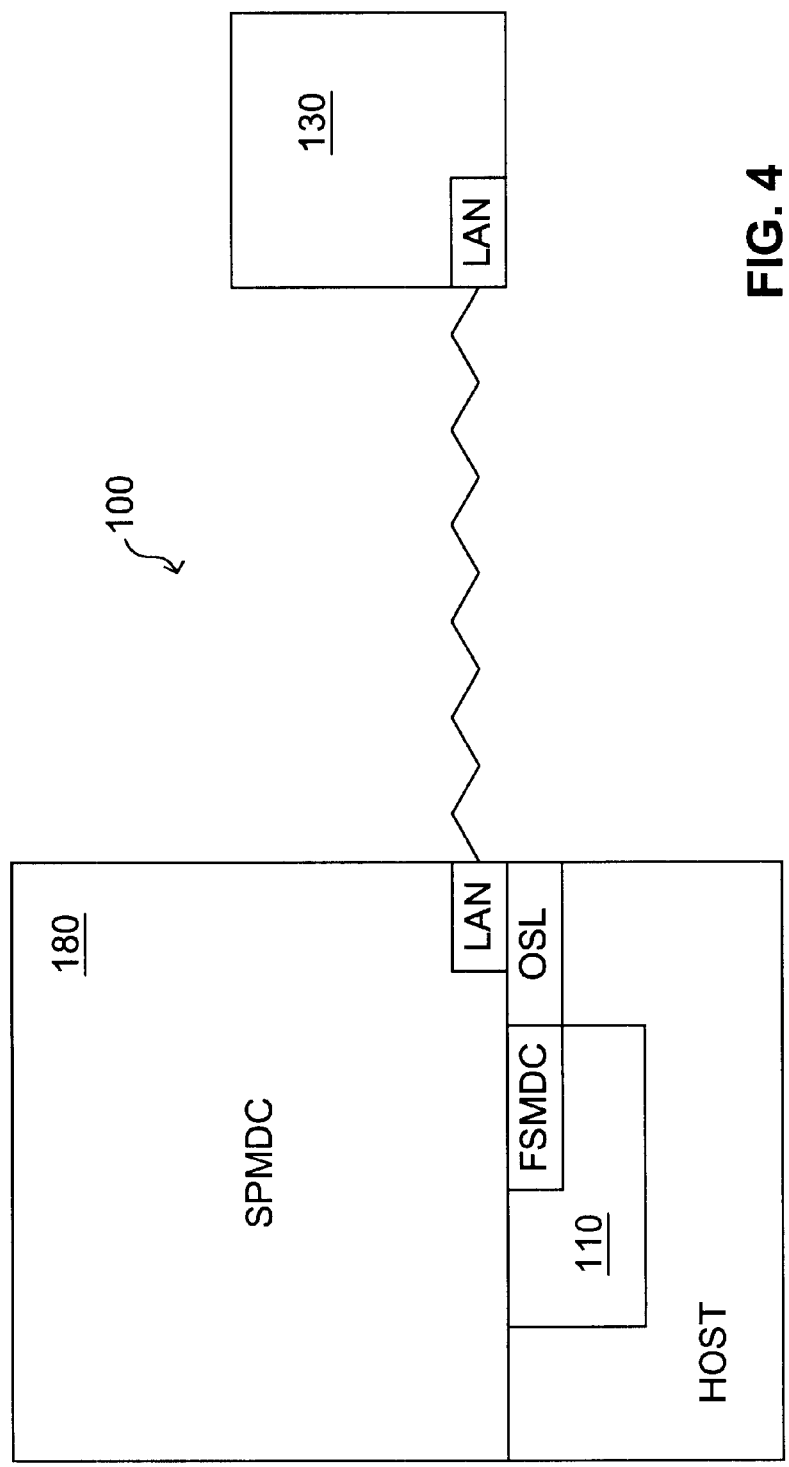
FIG. 4 depicts an interaction between a file manage system and a node in a system according to the invention.

FIG. 4 illustrates one implementation of a system of the present invention. Illustratively, the server 120 of FIG. 3 is implemented with a file sharing system 180 running on a host computer connected to the file storage unit 110, which may, by way of example be a Sun Microsystems Solaris data storage system, a Hewlett Packard storage system, or other data storage apparatus, and which may operate with a native or proprietary file system meta data controller, denoted FSMDC in the figure.

Typically, the FSMDC maintains suitable file size, block or other address information, and other meta data for the files stored therein, and interfaces with the networked system to handle data requests and transctions, which, as noted above will be identified by typically different data path and other address designations and file names in the network. The client nodes 130 communicate via LAN or other network with the host system to access data from the storage device, and the file sharing system 180, denoted SPMDC in the Figure, runs on the host and interfaces with the native FSMDC, to effect the necessary communications for shared access while maintaining file coherence and integrity.

In general terms, file sharing system 180 implements a messaging protocol for messages between the SPMDC and client nodes, and effects an interface with the native FSMDC; it encompasses the functions for providing maps for accessing client-requested data, keeping track of versions of data and of messages, monitoring file size, and generally performing the functions necessary to be a meta data controller when multiple clients may be accessing overlapping data stores, so that the native FSMDC may simply respond to client node data requests. In the embodiment of FIG. 4, these functions may include inhibiting FSMDC from changing file block addresses during the pendency of outstanding leases for the file.

Thus, as shown in FIG. 4, the embodiment 100 of the present invention employs a layer 180 that issues leases that include a map to the requested file and a lease duration, and assures accuracy of the map during the lease period. The client nodes 130, e.g., user workstations or terminals, of which one is illustrated, communicate over a LAN with the file sharing system 180 to obtain a lease for a desired file, and advantageously may then independently communicate over the LAN and/or a separate data line with the storage unit 110.

In a conventional network shared-access system, the host machine is the only machine that hard-mounts (read-write) the volume and lays down a file system and manages that file system with respect to authentication, security, administration, and allocation. Systems such as the IBM storage area network management system distributed under their "SANergy" trademark exploit existing operating system platforms and their file systems by interfacing with the existing file system proprietary FSMDC so that a number of simple network communications protocols allow the SPMDC to make them work correctly in a networked access data sharing world. In one respect, the SPMDC is somewhat like a file-server for a volume; other machines use conventional networking to access the volume and thus are authenticated and controlled in the traditional networking model. However, only meta data (file open, security, allocation information, etc.) take place in the SANergy approach; the actual file payload (data) is transferred directly between the storage elements and the accessing computers.

Thus, in such a system, the client nodes use ordinary networking to mount the volumes and open files, resulting in very fast transaction times. The SANergy code on the Client intercepts reads and writes and issues those directly to the disk elements. It does this by coordinating with the SPMDC (regarding caching) and asking the SPMDC for the list of physical blocks (i.e., a map) for the desired file. The SPMDC further effects necessary operations to maintain file coherence and provide accurate maps when there have been intervening file changes.

In order for clients to access a file's data by reading and writing directly to physical storage, the client must be told the exact physical information regarding the file. This is preferably done in a two-tier hierarchy: a physical description of the physical disks that comprise a logical volume and then the description of the file blocks relative to that volume information. The leases L(t) place a limitation on how long such transmitted description information is valid. The SPMDC may also take further steps to protect the overall "system" integrity of the data (i.e. caches).

In general, the SPMDC simplifies the overall task of allowing multiple computers to share physical storage directly, but it will be appreciated that this will in general involve rigorous adherence to rules and responsibilities of a properly coded MDC, such as proper updating and maintenance of MDC caches. File systems in general have always had an ability to "flush" dirty data to storage, but in the context of this SPMDC, this maintenance may also include "purging", meaning removing pages from the MDC memory system because those corresponding pages on disk might have been written by another machine. This permits 100% safe, reliable, coherent, and recoverable byte-level data sharing between multiply attached hosts.

In general, this implementation may require that the functions, parameters, and codes necessary for interface between a native commercial FSMDC and the SPMDC layer 180 be provided by the file system manufacturer, because these functions are very file system specific. Preferably, these are then wrapped-up into a single shared-object library which can be dynamically loaded by the higher level SPMDC code at run time. On a single MDC there may be more than one file system present and thus more than one of these libraries. Thus, the layers above the FSMDC are preferably configured so that they exhaustively load all detected FSMDC modules (shared libraries). This way new file system support will occur independently of the particular release of the SPMDC layer.

To address the dynamically changing file sizes, names etc, the implementation of a shared access system employs very specific ways of identifying data. To accomplish this in a preferred embodiment, the FSMDC layer interface employs a concept of a "file system specific and unique identifier" called cookies. A cookie is used for referencing both Files and Volumes. It is possible for a file while in use to have its name changed or even deleted. It is also possible for multiple separate files to share a common name. The use of cookies avoids any confusion.

Before the SPMDC application 180 can manipulate a file (extend the map, set a file size, etc.), it must first ask for a Cookie for that file (by name). All subsequent operations on a given "session" of a file will use that cookie and never the name again. Any and all reports from the FSMDC layer regarding a file (such as the allocation map) will also report back the associated volume cookie. Volumes can also change in definition while the file system is up and ruing (e.g. a volume can be extended, striping changed, or other physical disk members added). Any change to a volume results in a different cookie for the volume; this allows the SPMDC to dynamically detect any material changes to the file system and files, even while files are in-use. Attached hereto as Appendix A is a document setting forth suitable function requirements and structure for implementing an interface between a native FSMDC and the file sharing layer of this invention.

As illustrated in FIG. 4, in accordance with a principal aspect of the present invention, the filing sharing layer 180 is implemented such that when a client 130 requests a file, the client specifies a time interval during which access is required. Thus, for example it may request a specific file for two seconds, or ten minutes or an hour. The SPMDC 180 responds by granting a "lease", containing a "map" to the requested data on the storage unit 110 and having a term or duration which is set by the SPMDC 180. Thus, when the FSMDC layer delivers file-map information (the physical description of all the blocks that comprise a given file), this information has a life span associated with it ("lease"). The SPMDC layer decides how long a map is considered useable and reports back that information along with the map to the caller. The lease duration may be referenced to the message time of the original request. At the client end, a file access application assures that the caller (client) is obligated to not reference any part of the map or the blocks it represents beyond the lease duration, i.e., to neither read nor write after the lease term.

While a lease is active the file's allocated blocks are considered "locked". The FSMDC guarantees that there will be no removal or reclamation of any of those blocks of the file. In this regard, it is important to note that the current file-size is a separate concept and somewhat unrelated to whether blocks associated with a file are still associated with the file. An "unlock()" function may be provided to allow the higher layers to inform the FSMDC layer that the file map is no longer being referenced and thus the FSMDC layer is now free to reclaim any blocks or completely reorganize a file (for example, defragging). However, unlike a conventional system, the SPMDC 180 need not receive specific client communications closing out of a file. In this regard, if the lease on the file expires it is exactly as if the call to "unlock()" was made. The FSMDC need not keep counters to track how many times a particular file was locked. A single "unlock()" will unlock the file. Instead, the higher levels of software in the SPNDC track how many parties are active on a file and issue or defer issuing the unlock() call. The SPMDC 180 may, for example, issue the unlock call when no leases are in effect and no file changes have occurred.

As described above, the client 130 will provide a desired lease value to the SPMDC layer, and typically client nodes may ask for very short leases (i.e. 5 seconds) for files opened for read-only access. Files opened for read-write access are likely to have requests for much longer leases. Once a lease has been granted, the clients may typically let the lease expire rather than specifically "closing" the session, particularly for a read-only file access; this save much overhead in network communication. For read/write file accesses the client may report (or the SPMDC may monitor the FSMDC to detect) the end-of-file pointer when file size changes.

Thus, the FSMDC layer concerns itself with delivering file maps and considers the allocated blocks of a file "locked" until the unlock() function is called. The SPC layer implements the concept of leases, and manages calling the unlock() finction as needed. The SPMDC needs two file size values: the current reported file length (File Size) and the allocation size. For efficiency, when creating or extending a file, SPMDC application may ask that the file grow by a very large amount (100 MB for instance). It is assumed that the cost of allocating a small amount of space is about the same (overall) as allocating a larger amount, and thus to overallocate minimizes the number of times a file will need to be extended, an extremely important feature for LAN transmissions, network burden and related issues. Further, it is contemplated that a file's size may be changed at any time to any value by the local FSMDC or any client 130.

The allocation size, however, is only allowed to grow, until there are no locked-maps active. That is, if the SPMDC provides a locked-map to a requester, it is obligated to never reclaim and reassign those blocks until the file is unlocked (regardless if the request comes from a local process on the FSMDC or a client 130. Further, the SPMDC should report "file size" to any inquiring application, and not the allocation size. The file sharing application 180 employs a GetMap() function to allow the SPMDC to report both values. Similarly, there are functions provided by the FSMDC layer to allow SPMDC layer to change either or both values.

A more detailed understanding of the one implementation of a shared access file management system 180 and the how the client-to-SPMDC communications are effected based on the above described layered control structure may be had from Appendix B attached hereto, which describes a communications and interface protocol for effecting such shared access, maintaining suitable versions and allocations, and interfacing with the different equipment and system layers to carry out MDC functions for the multiply-accessed data blocks.

Applicant has identified this file system enhancement by the acronym MOTEL, denoting method of terminating enhanced leases, and has described above a simple implementation that removes the need for multiple extra network communications to coordinate file status and changes by simply issuing leases and effecting or allowing storage changes when leases are expired. The sharing protocol, rather than placing a bottleneck in front of all file request transactions, allows relatively direct file access and carries out storage housekeeping in the relatively few instances where it is needed by delaying or shifting file management tasks to not interfere with outstanding access grants, thus allowing relatively unencumbered direct storage sharing for routine file accesses. In general, it will be very efficient for the client to resort to a server-mediated access protocol such as the SANergy system, for interfacing with the storage device. It may also be advantageous, for certain classes of files, to maintain and provide "ghost" copies of file data from the server to the client, in a procedure as described in the above-referenced United States Patent.

When used in conjunction with a shared access file system as described in the aforesaid U.S. patent, the file manager may include a bypass mechanism, which executes on at least the client node, to intercede in the response to at least selected input/output, or access, requests generated by that node, and transfer data designated by such requests directly between the client node and the storage device, in lieu of transferring that data via the server. Such transfers by the bypass are made using the administrative information maintained by the file system relating to storage of such data on the peripheral device. The bypass can intercede in response to requests by the applications programs executing on the client node to read or write data on the peripheral device. Rather than permitting the file system to transfer that data via the server node and network, the bypass transfers it directly to the peripheral device. A further understanding of these and other aspects of this aspect of the system may be attained by reference to the aforesaid patent, the teachings of which (as noted above) are incorporated herein by reference.

Described herein are methods and apparatus meeting the objects set forth above. Those skilled in the art will appreciate that the illustrated embodiment is shown and described merely by way of example and that other embodiments incorporating changes therein fall within the scope of the invention. Thus, by way of non-limiting example, it will be appreciated that the invention has application in digital data processing systems other than storage area networks of the type illustrated in FIG. 1 and, indeed, may be applied in a variety of network and/or shared access environment. By way of further example, it will be appreciated that although the illustrated embodiment provides for leases among nodes that share storage devices, the teachings are equally applicable to the provision of leases client threads or processes which shall be understood to fall within the meaning of "nodes" as used in this regard herein. In view of the foregoing,

What we claim is:

1. A digital data processing system with improved access to information stored on a storage device, said system comprising:
    a first node and a second node coupled to one another over a network or other communications pathway, at least the second node being coupled to a storage device; and
    a file system executing on at least the second node, the file system responding to a request by the first node by issuing a lease, the lease including a map pertaining to a file identified by the request and having a defined lease time; and
    the first node utilizing the map in connection with accessing the file for the defined lease time, wherein the defined lease time has a lease expiry time referenced to a request time whereby the first and second node accurately determine the lease expiry time without requiring network time synchronization.

2. The digital data processing system of claim 1, wherein the file system determines change data for outstanding leases, and maintains meta data for files on the storage device.

3. The digital data processor of claim 1, wherein the file system sets a the lease time as a function of one or more of file size, number of outstanding leases, access request type, and network response time.

4. The digital data processor of claim 1, wherein the file system interfaces with a native file system meta data controller layer to unlock files and permit changes of block addresses after expiry of the lease.

5. The digital data processor of claim 1, wherein the file system interfaces with a native file system meta data controller layer to lock files or block addresses upon issuance of the lease.

6. The digital data processor of claim 1, further comprising a file application running on the first node configured to prevent the first node from accessing or referencing data of a requested file after expiry of the lease granted for said file.

7. The digital data processor of claim 1, wherein the file system sets the lease time as a function as a constant function of file access request type (read-only or read-write).

8. A digital data processing system with improved access to information stored on a storage device, said system comprising
    a first node and a second node coupled to one another over a network or other communications pathway, at least the second node being coupled to a storage device, and;
    a file system executing on at least the second node, the file system responding to a request by the first node by issuing a lease, the lease including administrative data pertaining to a file identified by the request and having a defined lease time;
    the first node utilizing the map in connection with accessing the file for the defined lease time; and
    a file application running on the first node configured to prevent the first node from accessing or referencing data of a requested file after expiry of the lease granted for said file, wherein the file application running on the first node operates to complete a file write and report end-of-file pointer to the second node prior to lease expiry.

9. A digital data processing system with improved access to information stored on a storage device, said system comprising;

a first node and a second node coupled to one another over a network or other communications pathway, at least the second node being coupled to a storage device, a file system executing on at least the second node, the file system responding to request by the first node by issuing a lease, the lease including administrative data pertaining to a file identified by the request and having a defined lease time, the first node utilizing the map in connection with accessing the file for the defined lease time, wherein the file system executing on the second node includes an interface layer effective to transfer data designated by the request between the first node and the storage device via the second node, while maintaining administrative information pertaining to storage of the data designated by the request on the storage device, and to implement a bypass for interceding in response to at least a first selected access request applied thereby to the file system, by transferring data designated by that request between the first node and the storage device over a direct communications pathway in accord with administrative information maintained by the file system pertaining to storage of that data on the storage device while maintaining file coherence and security.

10. A method of permitting shared access to storage for files in a networked system, wherein the networked system includes first nodes, such method comprising the steps of:

responding to a file request by a first node by providing a lease having a lease time, wherein the lease includes a map for accessing the file in a storage device;

permitting the first node to directly access the storage device during the lease time;

assuring that the map remains valid during the lease time by providing a file system operative on a second node, wherein the second node interfaces with the storage system by interfacing with a native file system meta data controller to lock the file when a the lease is provided to prevent re-allocation of block addresses of the file during the lease time, whereby the first node may directly access the file without extraneous messaging over the networked system to coordinate file access and maintain coherence.

11. A method of permitting shared access to storage for files in a networked system, wherein the networked system includes first nodes, such method comprising the steps of:

responding to a file request by a first node by providing a lease having a lease time, wherein the lease includes a map for accessing the file in a storage device;

permitting the first node to directly access the storage device during the lease time;

assuring that the map remains valid during the lease time by providing a file system operative on a second node, wherein the second node interfaces with the storage system by interfacing with a native file system meta data controller to unlock the file upon expiry of the lease time of an outstanding lease to prevent re-allocation of block addresses of the file during the lease time, whereby the first node may directly access the file without extraneous messaging over the networked system to coordinate file access and maintain coherence.

12. A method of permitting shared access to storage for files in a networked system, wherein the networked system includes first nodes, such method comprising the steps of:

responding to a file request by a first node by providing a lease having a lease time, wherein the lease time is set as a function of one or more of file size, number of outstanding leases, as a constant function of access request type (read-only, read-write), and network response time, wherein the lease includes a map for accessing the file in a storage device;

permitting the first node to directly access the storage device during the lease time; and assuring that the map remains valid during the lease time whereby the first node may directly access the file without extraneous messaging over the networked system to coordinate file access and maintain coherence.

13. A method of permitting shared access to storage for files in a networked system, wherein the networked system includes first nodes, such method comprising the steps of:

responding to a file request by a first node by providing a lease having a lease time, wherein the lease includes a map for accessing the file in a storage device;

permitting the first node to directly access the storage device during the lease time; and assuring that the map remains valid during the lease time whereby the first node may directly access the file without extraneous messaging over the networked system to coordinate file access and maintain coherence, wherein the lease time has a lease expiry time referenced to a file request time whereby the first and second node accurately determine the lease expiry time without requiring network time synchronization.

14. The method of claim 13, wherein the step of assuring that the map remains valid is effected by providing a file system operative on a second node, wherein the second node interfacing with the storage system to prevent re-allocation of block addresses of the file during the lease time.

15. The method of claim 13, wherein the step of permitting is effected by providing a file system on the first node effective to directly access the file during the lease time using the map.

16. The method of claim 15, wherein the file system on the first node is configured to prevent the first node from accessing or referencing data of a requested file after expiry of the lease granted for said file.

17. The method of claim 13, wherein the step of providing a lease includes setting a lease time referenced to time of a file request message.

18. The method of claim 13, wherein the step of providing a lease includes setting a lease time as a function of one or more of file size, number of outstanding leases, access request type (read-only, read-write), and network response time.

19. The method of claim 13, further comprising the step of preventing the first node from accessing or referencing data of a requested file after expiry of a lease granted for said file.

* * * * *

UNITED STATES PATENT AND TRADEMARK OFFICE
CERTIFICATE OF CORRECTION

PATENT NO. : 6,658,417 B1
DATED : December 2, 2003
INVENTOR(S) : Christopher John Stakutis and William Robert Haselton It is certified that error appears in the above-identified patent and that said Letters Patent is hereby corrected as shown below:

Column 5,
Line 50, after "server." begin new paragraph with "Coupling".

Column 12,
Line 30, delete "a the" and replace with -- the --.
Line 52, delete "device, and;" and replace with -- device; --.

Column 13,
Line 42, delete "a the" and replace with -- the --.

Signed and Sealed this

Seventh Day of March, 2006

JON W. DUDAS
*Director of the United States Patent and Trademark Office*